(12) United States Patent
Mannion et al.

(10) Patent No.: US 11,668,393 B2
(45) Date of Patent: Jun. 6, 2023

(54) ELECTRO-MECHANICAL ACTUATOR FOR AUTOMATIC TRANSMISSION

(71) Applicant: Ford Global Technologies, LLC, Dearborn, MI (US)

(72) Inventors: Kristen R. Mannion, Ann Arbor, MI (US); Emad Al-Regib, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 302 days.

(21) Appl. No.: 16/848,619

(22) Filed: Apr. 14, 2020

(65) Prior Publication Data

US 2021/0317913 A1 Oct. 14, 2021

(51) Int. Cl.
*F16H 61/32* (2006.01)
*F16H 61/18* (2006.01)

(52) U.S. Cl.
CPC ............. *F16H 61/32* (2013.01); *F16H 61/18* (2013.01); *F16H 2061/326* (2013.01)

(58) Field of Classification Search
CPC .... F16H 61/32; F16H 61/18; F16H 2061/326; F16H 63/3433; F16H 63/3466; F16H 63/3475; F16H 59/044; F16H 59/042; F16H 61/0213; F16H 63/304; F16H 63/3408

See application file for complete search history.

(56) References Cited

U.S. PATENT DOCUMENTS

| | | | | |
|---|---|---|---|---|
| 4,638,224 | A | * | 1/1987 | Gritter .................... B60L 50/60 318/400.26 |
| 6,918,314 | B2 | | 7/2005 | Wang |
| 7,832,302 | B2 | | 11/2010 | Wang |
| 10,352,399 | B2 | * | 7/2019 | Hudson ................ H02K 7/1166 |
| 10,377,353 | B2 | * | 8/2019 | Spaulding ................ B60K 6/48 |
| 2013/0161149 | A1 | * | 6/2013 | Hazama .............. F16H 63/3466 192/220.2 |
| 2018/0112774 | A1 | | 4/2018 | Littlefield et al. |
| 2019/0136974 | A1 | * | 5/2019 | Li .......................... F16H 57/039 |

OTHER PUBLICATIONS

Translation of WO 0032462 A1 (Year: 2000).*

* cited by examiner

*Primary Examiner* — Victor L MacArthur
(74) *Attorney, Agent, or Firm* — Burris Law, PLLC

(57) ABSTRACT

The present disclosure relates to a vehicle transmission system that includes a transmission component and an electro-mechanical actuator coupled to the transmission component. The electro-mechanical actuator includes an electric motor and a solenoid that are configured to maintain the transmission component in one of a park position and a non-park position upon receipt of a command. The electric motor and the solenoid are also configured to prevent the transmission component from returning to the park position upon receipt of the command. Further, the electric motor and solenoid are configured to receive the command from a vehicle control system.

20 Claims, 6 Drawing Sheets

ELECTRO-MECHANICAL ACTUATOR FOR AUTOMATIC TRANSMISSION

TECHNICAL FIELD

The present disclosure relates to a Shift-by-Wire system for an automatic transmission.

BACKGROUND

Automatic transmission is a type of transmission system for a vehicle that does not require a user's input to vary a power output from the transmission system. Generally, the automatic transmission has different operating modes, such as a neutral mode, a park mode, a driving mode, and a reverse mode. Conventionally, the automatic transmission includes a shifting mechanism that is mechanically coupled to a shifter using a mechanical linkage, such as cables and rods. In operation, a driver may operate the shifter to put the automatic transmission in one of the operating modes. Although the conventional shifting mechanism puts the automatic transmission in different operating modes, the conventional shifting mechanism has limitations associated therewith. For instance, the conventional shifting mechanism employs mechanical linkages that increase the overall weight of the vehicle. Moreover, the conventional shifting mechanism employs mechanical linkages that are prone to corrosion. In addition, the mechanical linkages tend to develop slack due to fatigue caused by their prolonged usage thereby affecting the performance of the conventional shifting mechanism. Moreover, any repair or replacement of the conventional shifting mechanism is a labor-intensive task.

One of the ways to mitigate the above-mentioned problems is to design an automatic transmission with a Shift-by-Wire shifting mechanism. However, designing the automatic transmission with the Shift-by-Wire shifting mechanism is both a time-consuming and labor-intensive task.

SUMMARY

The present disclosure relates to embodiments of an electro-mechanical actuator for an automatic transmission. The electro-mechanical actuator of the present disclosure can be used with an existing automatic transmission that uses a mechanical shifting mechanism.

One embodiment of the present disclosure relates to a vehicle transmission system that includes a transmission component and an electro-mechanical actuator coupled to the transmission component. The electro-mechanical actuator includes an electric motor and a solenoid which are configured to maintain the transmission component in one of a park position and a non-park position upon receipt of a command. The electric motor and the solenoid are also configured to prevent the transmission component from returning to the park position upon receipt of the command. Further, the electric motor and the solenoid are configured to receive the command from a vehicle control system.

According to an embodiment, the vehicle control system includes a processing unit and an interface configured to receive the command from a driver of the vehicle in which the vehicle transmission is installed. In one example, the command corresponds to a driver's instruction to put the vehicle in one of a driving mode, a reverse mode, or a neutral mode.

Another embodiment of the present disclosure relates to an electro-mechanical actuator that includes a first lever, a second lever, a transfer gear, and an electric motor coupled to the transfer gear, the first lever, and the second lever. The electro-mechanical actuator also includes a solenoid, such that an electric motor and the solenoid are configured to maintain an external vehicle transmission system in one of a park position and a non-park position. In addition, the receipt of the command also causes the electric motor and the solenoid to prevent the external vehicle transmission system from returning to the park position. In one example, the electro-mechanical actuator is coupled to the external vehicle transmission system via the first lever.

According to an example, the command may correspond to an instruction to cut-off power to the electric motor or the solenoid. Further, execution of the command causes the first lever to rotate clockwise to lock the second lever in a home position. At the home position, the first lever prevents the rotation of the second lever to maintain the park position of the external vehicle transmission.

According to another example, the command is for putting the vehicle in a driving, a reverse or a neutral mode. In response to the command, the solenoid is configured to drive a pawl for the first lever in a position that allows the external vehicle transmission system to put the vehicle in one of the driving, the reverse or the neutral mode.

Yet another embodiment of the present disclosure relates to the vehicle that includes an electro-mechanical actuator that is coupled to an external vehicle transmission system. The electro-mechanical actuator is configured to control the vehicle control system to either maintain the vehicle in a park position or maintain the vehicle in a non-park position or prevent the vehicle to return to the park position.

BRIEF DESCRIPTION OF THE DRAWINGS

The above-mentioned embodiments are further described herein with reference to the accompanying figures. It should be noted that the description and the accompanying figures relate to exemplary embodiments and should not be construed as a limitation to the present disclosure. It is also to be understood that various arrangements may be devised that, although not explicitly described or shown herein, embody the principles of the present disclosure. Moreover, all statements herein reciting principles, embodiments, and embodiments of the present disclosure, as well as specific examples, are intended to encompass equivalents thereof.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc.

Unless the context indicates otherwise, throughout the specification and claims which follow, the word "comprise" and variations thereof, such as, "comprises" and "comprising" are to be construed in an open, inclusive sense that is as "including, but not limited to." Further, the terms "first," "second," and similar indicators of the sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

Figure 1:
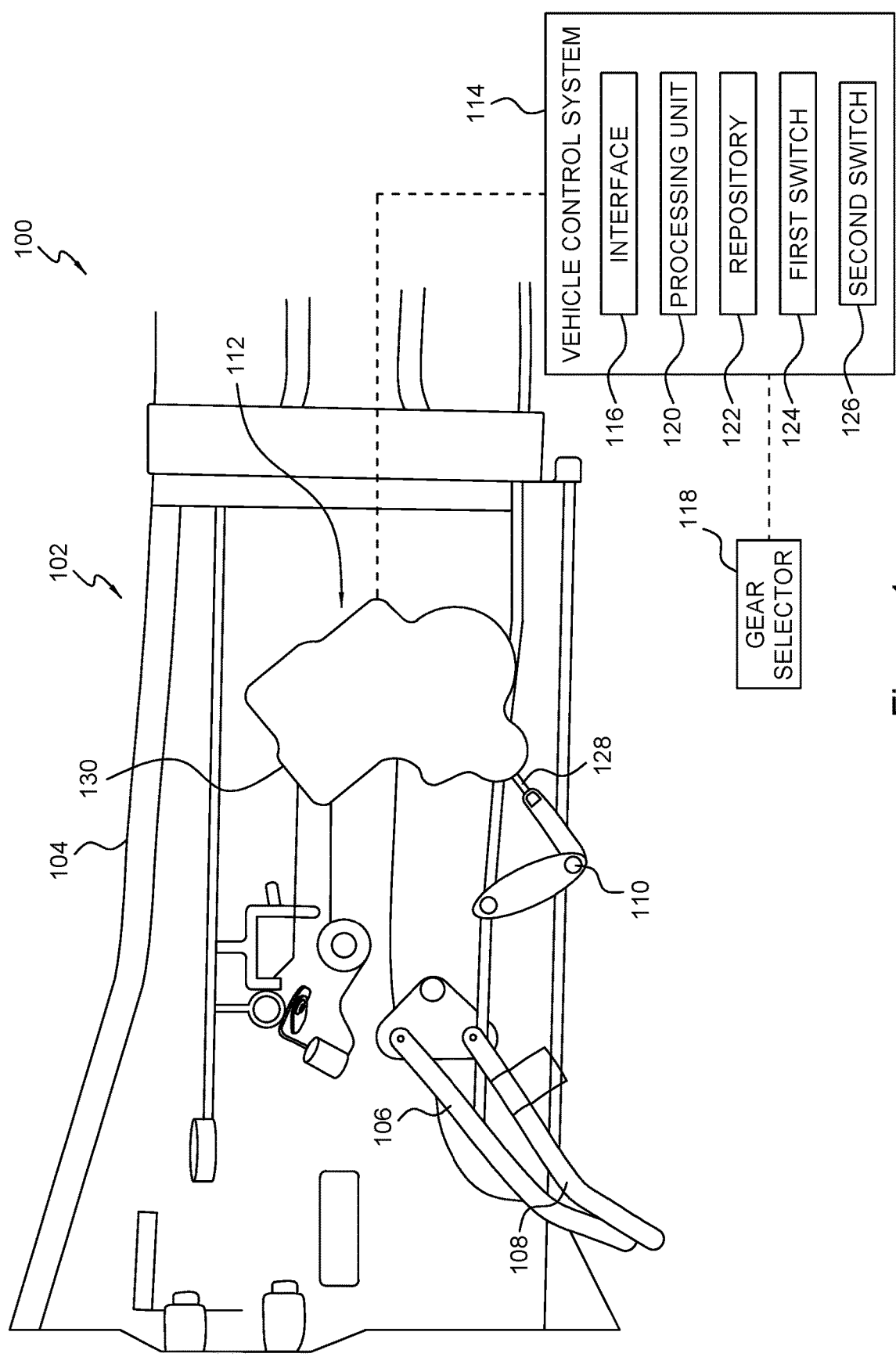
FIG. 1 illustrates a vehicle transmission system, in accordance with one embodiment of the present disclosure.

FIG. 1 illustrates a vehicle transmission system 100, in accordance with one embodiment of the present subject matter. The vehicle transmission system 100 can be a part of a powertrain of a vehicle. The vehicle may be any vehicle or an automobile such as a car, van, or bus (including an autonomous or semi-autonomous vehicle), using all known methods of powertrain and propulsion systems (i.e., combustion engine, battery-electric, hybrid, etc.).

The vehicle transmission system 100 includes a transmission component 102 that is employed to vary an amount of power generated by a prime mover (not shown in the Figure) to a plurality of wheels (not shown in Figure) of the vehicle via an output shaft (not shown in Figure). Such variation in power is based on a load requirement of the vehicle. The transmission component 102, in one example, is an automatic transmission and can assume one of different operating modes, such as a neutral mode, a driving mode, a reverse mode, or a park mode. The neutral mode is a mode in which the transmission component 102 does not output power to the output shaft. Further, the driving mode is a mode in which the transmission component 102 outputs the power to move the vehicle forward while the reverse mode is a mode in which the transmission component 102 outputs the power to move the vehicle rearward. Furthermore, the park mode is a mode in which the transmission component 102 locks the output shaft from turning and transmitting the power to the plurality of wheels.

The transmission components 102 includes a casing 104 that houses a plurality of gear mechanisms (not shown in Figure) and a plurality of clutch mechanisms (not shown in Figure) that operate within the transmission component 102 to vary the amount of power to the output shaft. The casing 104 includes ports (not shown in Figure) to allow transmission oil lines 106 and 108 to attach thereto so as to circulate transmission oil within the casing 104. The transmission oil lubricates the plurality of gear mechanisms inside the transmission component 102. In addition, the transmission oil cools the transmission component 102 by dissipating heat, which is generated by an operation of the plurality of the gear mechanisms, away from the transmission component 102. The transmission component 102 also includes an operating lever 110 operably mounted on the casing 104 and is configured to put the transmission component 102 in one of the operating modes.

The vehicle transmission system 100 includes an electro-mechanical actuator 112 that is coupled to the transmission component 102 via the operating lever 110. The electro-mechanical actuator 112 facilitates Shift-by-Wire functionality to the transmission component 102. Thereby, the electro-mechanical actuator 112 facilitates Shift-by-Wire functionality to the vehicle transmission system 100.

In one embodiment, the vehicle transmission system 100 may be a non-Shift-by-Wire transmission and the electro-mechanical actuator 112 may be externally coupled to the vehicle transmission system 100 to convert the non-Shift-by-Wire transmission to the Shift-by-Wire transmission. In such a scenario, the vehicle transmission system 100 may be referred to as an external vehicle transmission system.

The electro-mechanical actuator 112 includes a housing 130 that houses various other components of the electro-mechanical actuator 112 that are responsible to operate the operating lever 110. In one example, the housing 130 is removably mounted to the casing 104 by fastening means, such as nuts and bolts or clamps, such that the electro-mechanical actuator 112 can be detached from the casing 104 for repairing or servicing. The electro-mechanical actuator 112 includes an actuation lever 128 housed in the housing 130 in such a way that a portion of the actuation lever 128 protrude from the housing 130. Further, the actuation lever 128 pivotably couples with the operating lever 110 and can move linearly with respect to the housing 130 to rotate the operating lever 110 in order to engage one of the aforementioned operating modes. A manner by which the actuation lever 128 is coupled to the electro-mechanical actuator 110 will be described below. The electro-mechanical actuator 112 also includes a solenoid (not shown in Figure) and an electric motor (not shown in Figure) housed in the housing 130 and are configured to put and maintain the transmission component 102 in a park position that corresponds to the park mode. In addition, the solenoid and the electric motor are configured to put and maintain the transmission component 102 in a non-park position that corresponds to one of the driving mode, the neutral mode, or the reverse mode. Moreover, the solenoid and the electric motor are configured to prevent the transmission component 102 to return to the park position. A manner by which the solenoid and the electric motor operates is explained in FIG. 2.

In one example, the electro-mechanical actuator 112 is configured to receive a command from a vehicle control system 114 to put the transmission component 102 in the park position or the non-park position. The vehicle control system 114, in one example, can be external to the electro-mechanical actuator 112. In another example, the vehicle control system 114 can be integrated with the electro-mechanical actuator 112. According to an example, the vehicle control system 114 is coupled to the electro-mechanical actuator 112 using wires, such as a Controller Area Network (CAN) bus. Since the electro-mechanical actuator 112 is coupled to the vehicle control system 114 for changing the operating modes of the transmission component 102, the electro-mechanical actuator 112 eliminates the use of a cable and a mechanical shifter for controlling operations of the transmission component 102. As a result, any failure associated with mechanical linkages are alleviated.

According to an example, the vehicle control system 114 includes an interface 116 which is configured to receive the command from a user, for instance, a driver of the vehicle in which the vehicle transmission system 100 is installed. The interface 116 may be the CAN bus that couples the vehicle control system 114 to a gear selector 118 installed in a cabin compartment of the vehicle. During operation, the driver may operate the gear selector 118 to send the command to the vehicle control system 114 to put the transmission component 102 in either the park position or the non-park position.

According to an example, the vehicle control system 114 includes a processing unit 120 coupled to the interface 116 and is configured to process the command and instruct the electro-mechanical actuator 112. The processing unit 120 can be implemented as one or more microprocessors, microcomputers, microcontrollers, digital signal processors, central processing units, state machines, logic circuitries, and/or any devices that manipulate signals, based on operational instructions. The vehicle control system 114 may also include a repository 122 that stores a library of a set of instructions, that corresponds to the command, for the electro-mechanical actuator 112. In operation, the processing unit 120 determines the set of instructions for the electro-mechanical actuator 112 that, when executed, causes the electro-mechanical actuator 112 to put the transmission component 102 in one of the aforementioned positions. The vehicle control system 114 also includes a plurality of switches, such as a first switch 124 and a second switch 126 to facilitate the supply of power to the electro-mechanical actuator 112. In the illustrated example, the first switch 124 and the second switch 126 can be controlled by the processing unit 120 to facilitate the flow of electric current to the solenoid and the electric motor, respectively from an electrical source (not shown in Figure), such as a battery. Moreover, the first switch 124 and the second switch 126 are configured to switch a polarity of the electric current fed to the solenoid and the electric motor, respectively.

Figure 2:
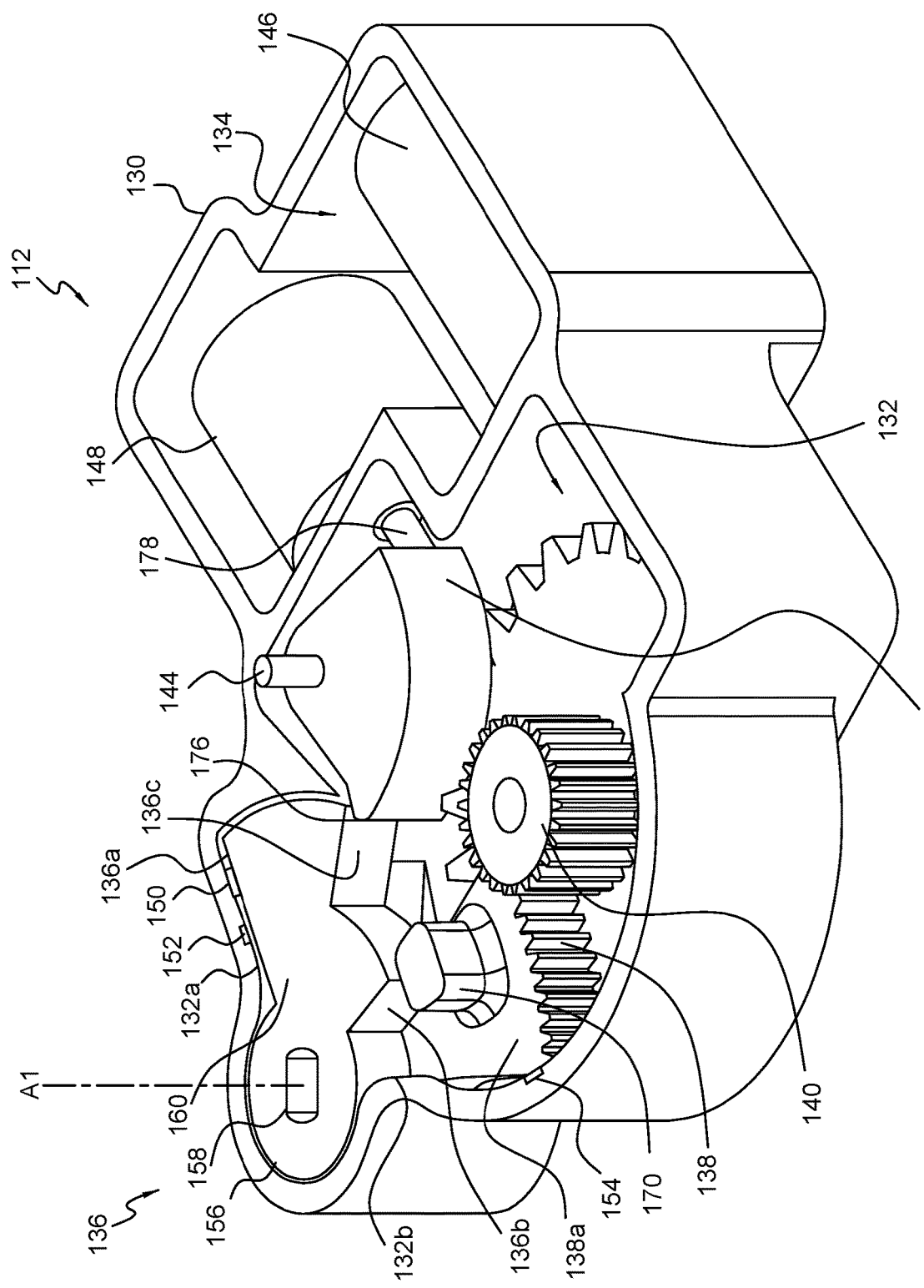
FIG. 2 illustrates a detailed schematic of the electro-mechanical actuator, in accordance with one embodiment of the present subject matter.

FIG. 2 illustrates a detailed schematic of the electro-mechanical actuator 112, in accordance with one embodiment of the present subject matter. As mentioned before, the electro-mechanical actuator 112 includes the housing 130 that houses various components of the electro-mechanical actuator 112. Further, the housing 130 includes a first section 132 and a second section 134 to house different components within the housing 130. The electro-mechanical actuator 112 further includes a first lever 136 that is configured to put the transmission component 102 in either the park position or the non-park position. Further, the first lever 136 can rotate about a rotational axis A1 to put the transmission component 102 in the aforementioned positions.

In one example, the first lever 136 is housed inside the first section 132 of the housing 130. The first lever 136 is mechanically coupled to the actuation lever 128 (shown in FIG. 1) in such a way that the rotation of the first lever 136 causes the actuation lever 128 to move linearly. Further, the actuation lever 128 operates the operating lever 110 to move the transmission component 102 to assume different operating modes. For instance, the actuation lever 128 is coupled to the first lever 136 by a rack and pinion mechanism (not shown in the Figure). According to an example, a pinion gear of the rack and pinion mechanism is coupled to the first lever 136 while a rack of the rack and pinion mechanism is attached to the actuation lever 128. Further, the first lever 136 includes an attachment portion 156 that includes an attachment point 158 at which the pinion gear can be attached by fastening means, such as, but not limited to nuts and bolts. The first lever 136 also includes an engagement portion 160 that is configured to rotate about the rotational axis A1 inside the first section 132.

In one example, the first lever 136 can assume two positions namely, a home position and a locked position. The home position (not illustrated in FIG. 2) is a position in which a second side surface 136b of the first lever 136 abuts a second wall 132b of the first section 132. In this example, the first lever 136 in the home position allows the operating lever 110, (shown in FIG. 1) to put the transmission component 102 in the park position.

On the other hand, the locked position, as shown in FIG. 2, is a position in which a first side surface 136a of the first lever 136 abuts a first wall 132a of the first section 132. Further, the first lever 136 in the locked position restricts the movement of the operating lever 110 (shown in FIG. 1) to put the transmission component 102 in the park position.

The electro-mechanical actuator 112 also includes a second lever 138 that facilitates the first lever 136 to rotate between the home position and the locked position. Moreover, the second lever 138 is configured to maintain the first lever 136 in the locked position. In one example, the second lever 138 is installed proximate to the first lever 136 inside the first section 132. In the illustrated example, the electro-mechanical actuator 112 is installed in such a way that the second lever 138 can rotate about the rotational axis A1. Further, the second lever 138 is installed on a base (not shown in Figure) of the housing 130 and below the first lever 136, such that a rotation of the second lever 138 controls a rotation the first lever 136. To control a degree of the rotation, the second lever 138 includes a protrusion 170 on a top surface 138a that can engage a third side surface 136c of the first lever 136 to rotate the first lever 136. In addition, the protrusion 170 prevents the rotation of the first lever 136 towards the second wall 132b and past the second lever 138. In other words, the protrusion 170 of the second lever 138 prevents the third side surface 136c of the first lever 136 to contact the second wall 132b.

The electro-mechanical actuator 112 also includes a transfer gear 140 that enables the second lever 138 to facilitate rotation of the first lever 136. For instance, the transfer gear 140 operates the second lever 138 to move the first lever 136 to rotate between the home position and the locked position. In one example, the transfer gear 140 is operably coupled to the second lever 138, such that the transfer gear 140 rotates the second lever 138 to rotate the first lever 136. The transfer gear 140 can engage with the second lever 138 using a gear meshing to rotate the second lever 138. A detailed explanation of how the transfer gear 140 engages with the second lever 138 is provided with respect to FIG. 3.

In one example, in order to hold the first lever 136 in the locked position, the electro-mechanical actuator 112 includes a pawl 142 that acts as an arrestor to hold the first lever 136 in the locked position. Further, the pawl 142 is configured to mount in the first section 132 in such a way that the pawl 142 can selectively engage with the first lever 136. For instance, the pawl 142 is pivotably mounted in the first section 132 by a pivoting rod 144. The pawl 142 is configured to engage with the third side surface 136c when the first lever 136 is at the locked position. The pawl 142 has a shape of a sector of a cylinder with a locking projection 176 on one end of the pawl 142.

According to the present disclosure, the electro-mechanical actuator 112 includes various electrical components that impart motion to the transfer gear 140 and the pawl 142 to control the first lever 136. For instance, in order to rotate the transfer gear 140 and consequently the first lever 136, the electro-mechanical actuator 112 includes the electric motor 146 that is housed in the second section 134 of the housing 130. The electric motor 146 can be one of a stepper motor, a direct current motor, and an alternating current motor. The electric motor 146 can rotate a shaft (not shown in FIG. 2) of the electric motor 146 in both clockwise and counter-clockwise directions. Further, the electric motor 146 can be coupled to the first switch 124 (shown in FIG. 1). In one example, the transfer gear 140, operably coupled to the electric motor 146, is configured to operate when the electric motor 146 is powered by the vehicle control system 114 (shown in FIG. 1).

The electro-mechanical actuator 112 also includes the solenoid 148 housed in the second section 134 and is configured to pivot the pawl 142 to selectively engage the pawl 142 with the first lever 136 via a plunger 178. Although not shown, the plunger 178 is coupled to a side surface (not shown in Figure) of the pawl 142 at a point which is offset from the pivoting rod 144. The solenoid 148 is configured to facilitate the locking of the first lever 136 at the locked position. The solenoid 148 also allows a quick return of the first lever 136 from the non-park position to the park position. In operation, the plunger 178 moves towards the first section 132 when the electric current is provided from the electrical source to the solenoid 148 via the second switch 126, thereby causing the locking projection 176 to pivot towards the third side surface 136c. The solenoid 148 may also include a return mechanism, such as a spring that can cause the plunger 178 to slide back towards the second section 134 when the electric current to the solenoid 148 is terminated. Further, based on a design of the electro-mechanical actuator 112, the solenoid 148 can be a direct-action solenoid that pushes the plunger 178 to pivot the pawl 142. In one example, the solenoid 148 and the electric motor 146 are operated using the switches 126 and 124 respectively to prevent the transmission component 102 to return to the park position.

The electro-mechanical actuator 112 includes additional components that facilitate the operation of the electro-mechanical actuator 112. For instance, the electro-mechanical actuator 112 includes a biasing element 150 that is coupled to the first side surface 136a of the first lever 136 and the first wall 132a of the first section 132. The biasing element 150 is configured to move the first lever 136 from the locked position to the home position, and consequently moves the operating lever 110 (shown in FIG. 1) from the non-park position to the park position.

The electro-mechanical actuator 112 also includes a plurality of position sensors that senses a position and/or a degree of rotation of the first lever 136 and the second lever 138. For instance, the electro-mechanical actuator 112 includes a first position sensor 152 mounted on the first wall 132a that senses a position of the first lever 136 with respect to the first wall 132a. In other words, the first position sensor 152 is configured to sense the proximity of the first lever 136 with respect to the first wall 132a and to generate a signal when the first lever 136 is proximate to the first wall 132a. The electro-mechanical actuator 112 also includes a second position sensor 154 which is mounted on the second wall 132b and senses a position of the second lever 138 with respect to the second wall 132b. In other words, the second position sensor 154 is configured to generate a signal when the second lever 138 is proximate to the second wall 132b. Further, both the first position sensor 152 and the second position sensor 154 are communicably coupled to the processing unit 120 (shown in FIG. 1) which uses the signals generated by both the position sensors 152 and 154 to control the electric motor 146 and the solenoid 148.

Although not shown, the electro-mechanical actuator 112 includes a mode selector. The mode selector is configured to operate the operating lever 110 (shown in FIG. 1) to put the transmission component 102 in either the driving mode, the reverse mode, or the neutral mode when the first lever 136 puts the transmission component 102 in the non-park position. Further, the mode selector is engaged with the operating lever 110 (shown in FIG. 1) and the first lever 136 in such a way that the first lever 136 permits the mode selector to engage one of the aforementioned modes when the first lever 136 is at the locked position. For instance, the first lever 136 is configured to engage the mode selector to the operating lever 110 (shown in FIG. 1) when the first lever 136 is at the locked position.

Therefore, the electromechanical actuator 112 is configured to put the transmission component 102 in the park mode, the non-park mode and a manual override mode, where the transmission component 102 is the part of the vehicle transmission system 100. In another embodiment, the electro-mechanical actuator 112 is externally coupled to the vehicle transmission system 100. As discussed earlier, in such a scenario, the vehicle transmission system 100 may be referred to as the external vehicle transmission system. Therefore, the electromechanical actuator 112 is configured to put the external vehicle transmission system in the park mode, the non-park modes, and the manual override mode.

Figure 3:
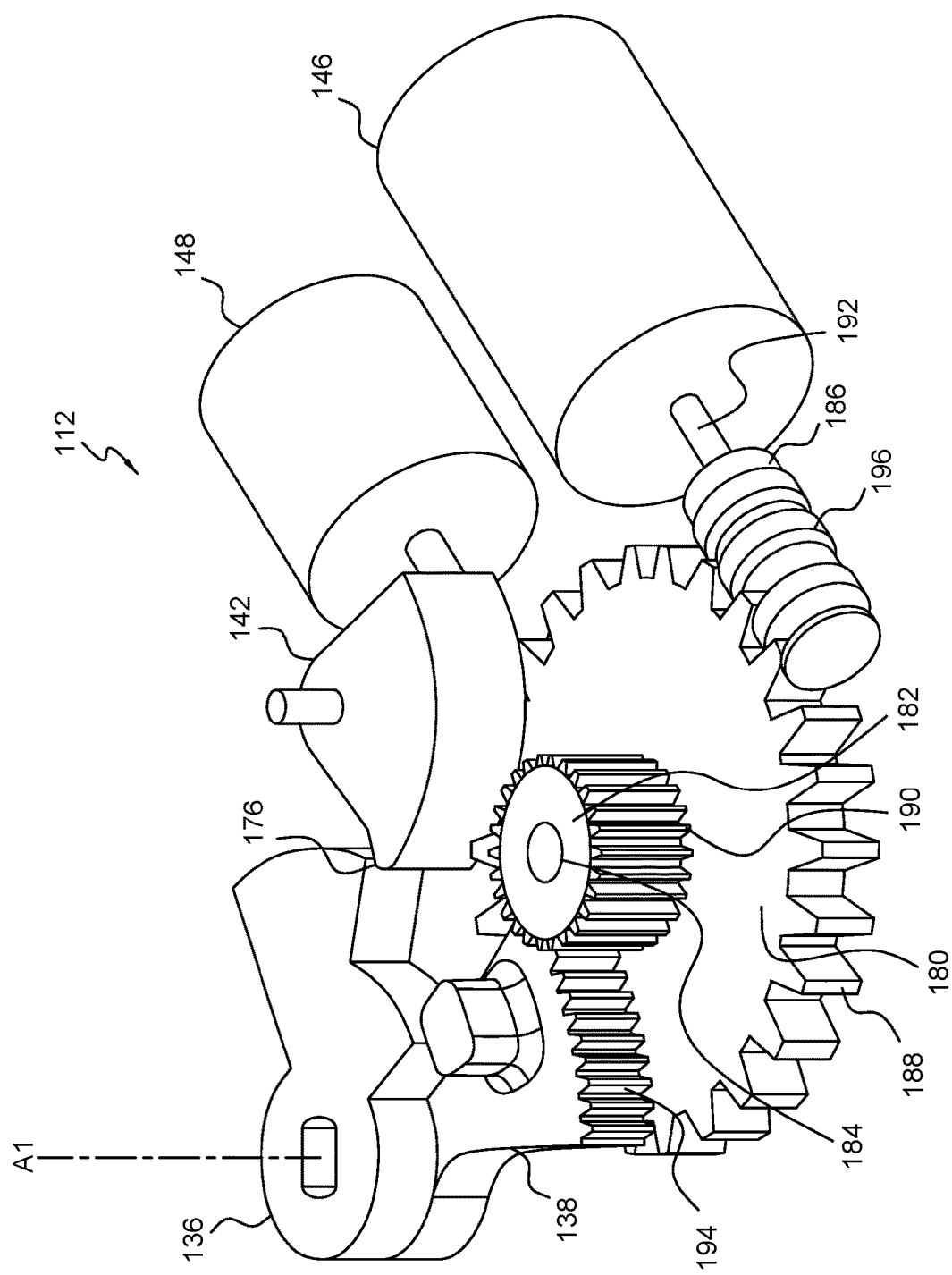
FIG. 3 illustrates various components of the electro-mechanical actuator without the housing, in accordance with one embodiment of the present subject matter.

FIG. 3 illustrates various components of the electro-mechanical actuator 112 without the housing 130, in accordance with one embodiment of the present subject matter. In the illustrated embodiment, the transfer gear 140 is a compound gear that includes a first gear 180 and a second gear 182. In one example, the transfer gear 140 can be manufactured using molding as a single component. In another example, the transfer gear 140 can be assembled by mounting the first gear 180 and the second gear 182 on a shaft 184 so that the first gear 180 and the second gear 182 rotate at the same speed. Further, the first gear 180 includes first external teeth 188 on a periphery of the first gear 180 while the second gear 182 includes second external teeth 190 on a periphery of the second gear 182. Furthermore, the first gear 180 is larger than the second gear 182 and accordingly, the number of first external teeth 188 are more than the second external teeth 190.

In one example, the first gear 180 and the second gear 182 are spur gears, each having straight-cut first external teeth 188 and second external teeth 190, respectively. In another example, the first gear 180 and the second gear 182 are helical gears with the first external teeth 188 and the second external teeth 190 having a helix profile. In yet another example, the first gear 180 and the second gear 182 are herringbone gears. In one example, the first gear 180 and the second gear 182 can be manufactured by a wide variety of materials, such as but not limited to, cast iron, steel, brass, and bronze.

According to an example, the electric motor 146 includes a shaft 192, which is coupled to a worm gear 186. The worm gear 186 includes an external worm profile 196 that meshes with the first external teeth 188 in such a way that the worm gear 186 and the first gear 180 form a worm drive. Further, the worm drive governs the rotation of the first gear 180. On the other hand, the second lever 138 includes third external teeth 194 on a periphery of the second lever 138. Further, the third external teeth 194 are in mesh with the second external teeth 190 of the second gear 182, such that there is no interference therebetween. As a result, the meshing does not impede the rotation of the second gear 182 about the rotational axis A1. In operation, the worm gear 186 is rotated by the electric motor 146, which rotates the first gear 180. Further, since the transfer gear 140 is the compound gear, the second gear 182 and the first gear 180 rotate at the same speed. Further, as the second gear 182 rotates, the meshing between the second external teeth 190 and third external teeth 194 causes the second lever 138 to rotate, for instance, towards the first wall 132a (shown in FIG. 2). However, in case the second gear 182 inadvertently rotates towards the second wall 132b (shown in FIG. 2), for instance, due to vibrations, the worm drive prevents such rotation.

According to yet another embodiment of the present disclosure, the meshing of the worm gear 186 with the first external teeth 188 and the meshing of the second external teeth 190 with the third external teeth 194 are lubricated to reduce friction to ensure smooth motion through the meshing. In addition, the lubrication absorbs heat that is generated during motion through the meshing. In one example, the lubrication can be in the form of a semisolid lubricant that is applied on the worm gear 186, the first external teeth 188, the second external teeth 190, and the third external teeth 194. In another example, the lubrication can be in the form of a lubricant bath formed in the first section 132 (shown in FIG. 2), such that the second lever 138 and the transfer gear 140 are submerged in the lubricating oil. In case the lubrication is in the form of the bath, the first section 132 and the second section 134 are fluidically isolated so that the lubricating oil is prevented from seeping into the second section 134 in which the electric motor 146 and the solenoid 148 are housed.

Figure 4:
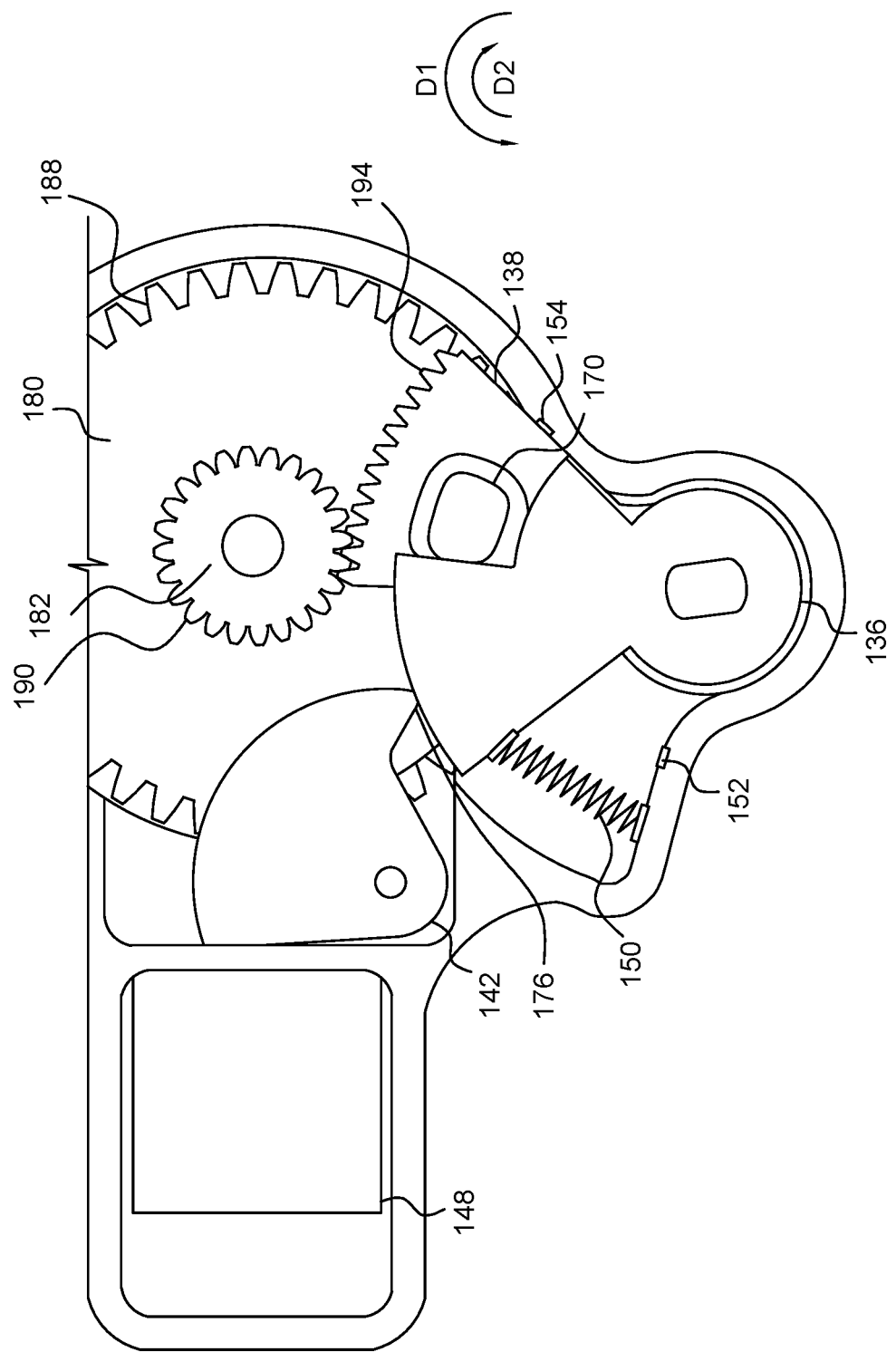
FIG. 4 illustrates the electro-mechanical actuator in a state where the electro-mechanical actuator maintains the transmission component in the park position, in accordance with one embodiment of the present subject matter.
Figure 5:
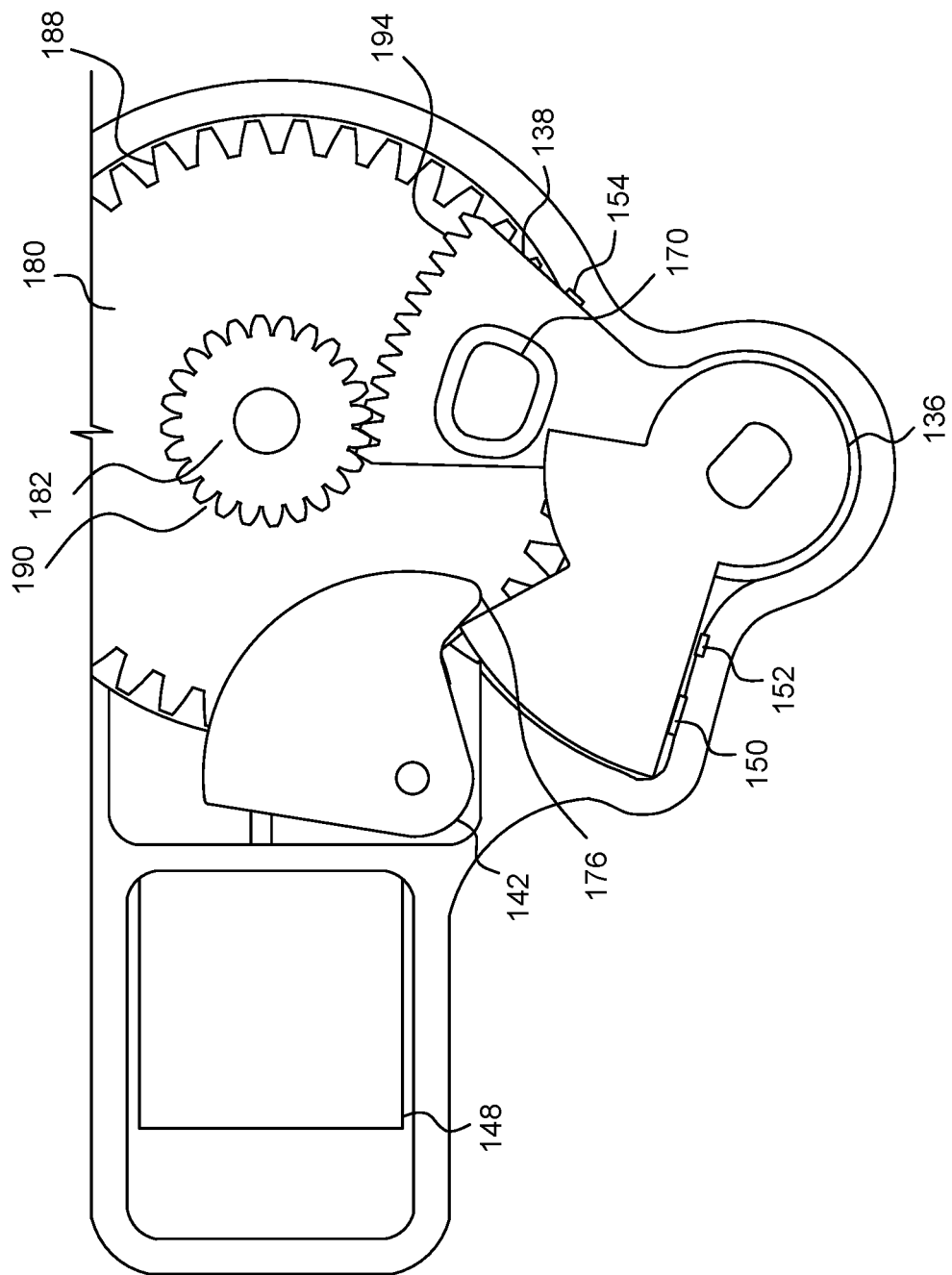
FIG. 5 illustrates the electro-mechanical actuator in a state where the electro-mechanical actuator maintains the transmission component in the non-park position, in accordance with one embodiment of the present subject matter.
Figure 6:
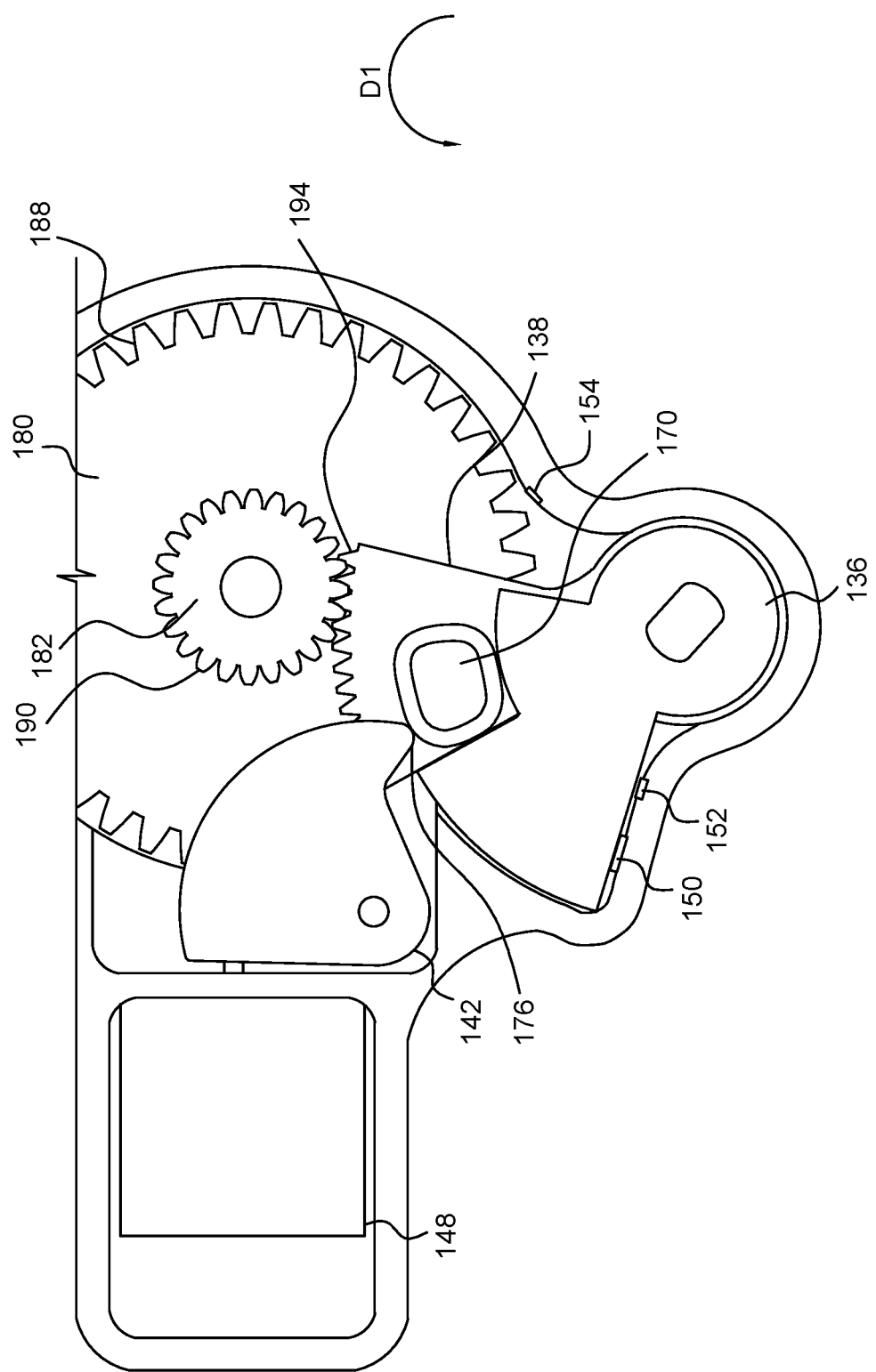
FIG. 6 illustrates the electro-mechanical actuator in a state where the electro-mechanical actuator prevents the transmission component to return to the park position, in accordance with one embodiment of the present subject matter.

The operation of the electro-mechanical actuator 112 shown in FIGS. 1, 2, and 3 will now be described in conjunction with FIGS. 4, 5, and 6. FIG. 4 illustrates the electro-mechanical actuator 112 in a state where the electro-mechanical actuator 112 maintains the transmission component 102 in the park position. Further, FIG. 5 illustrates the electro-mechanical actuator 112 in a state where the electro-mechanical actuator 112 maintains the transmission component 102 in the non-park position. Finally, FIG. 6 illustrates the electro-mechanical actuator 112 in a state where the electro-mechanical actuator 112 prevents the transmission component 102 to return to the park position.

Initially, at the park position as shown in FIG. 4, the first lever 136 and the second lever 138 are at the home position. Further, at the home position, the first lever 136 allows the mode selector to operate the actuation lever 128. Consequently, the actuation lever 128 operates the operating lever 110 to engage one of the operating modes, i.e. the driving mode, the neutral mode, or the reverse mode. Further, the driver may operate the gear selector 118 to send a command to the vehicle control system 114 to put the vehicle in the park mode. The command is received by the processing unit 120 via the interface 116. The processing unit 120 processes the command by looking for the set of instructions in the repository 122 corresponding to the received command. In one example, the processing unit 120, upon determining the set of instructions, sends a signal to the first switch 124 to power the electric motor 146.

Once the first switch 124 receives the signal, the first switch 124 establishes an electric connection to allow the electric current to flow from the electrical source to the electric motor 146. Further, the flow of the electric current in the electric motor 146 causes the shaft 192 and the worm gear 186 to rotate clockwise. Further, the clockwise rotation of the worm gear 186 causes the first gear 180 of the transfer gear 140 to rotate clockwise. Since the first gear 180 is coupled to the second gear 182, the second gear 182 also rotates clockwise. Further, due to the meshing between the second external teeth 190 and the third external teeth 194, the second lever 138 rotates counterclockwise in a first direction D1. As the second lever 138 rotates, the protrusion 170 abuts the third side surface 136c and pushes the first lever 136 towards the first wall 132a of the first section 132 along the first direction D1 (counterclockwise). As the first lever 136 moves towards the first wall 132a, the first lever 136 compresses the biasing element 150 thereby energizing it. The second lever 138 and the first lever 136 continue to move towards the first wall 132a until the first lever 136 is proximate to the first wall 132a at the locked position as shown in FIG. 5. As the first lever 136 is at the locked position, the first position sensor 152 sends a signal to the processing unit 120. Simultaneously, the first lever 136, at the locked position, enables the actuation lever 128 to operate the operating lever 110 to put the transmission component 102 in one of the driving mode, neutral mode, and the reverse mode.

Upon the receipt of the signal from the first position sensor 152, the processing unit 120 sends an instruction to the second switch 126. The second switch 126 facilitates the transfer of electric current to the solenoid 148 from the electrical source to drive the pawl 142 via the plunger 178, such that the locking projection 176 engages the third side surface 136c of the first lever 136. Once engaged, the processing unit 120 instructs the first switch 124 to switch the polarity of the electric current fed by the electrical source to the electric motor 146 causing the shaft 192 and the worm gear 186 to rotate counterclockwise. As a result, the worm gear 186 causes the first gear 180, and consequently the second gear 182 to rotate counterclockwise in the first direction D1. Further, the counterclockwise rotation in the first direction D1 of the second gear 182 causes the clockwise rotation of the second lever 138. As a result, the second lever 138 starts rotating in a second direction D2 towards the second wall 132b of the first section 132.

The second lever 138 continues to rotate in the second direction D2 until the second lever 138 is proximate to the second wall 132b. As the second lever 138 comes near the second wall 132b, the second position sensor 154 detects the second lever 138 and sends a signal to the processing unit 120 indicating that the second lever 138 is at the home position. Accordingly, the processing unit 120 sends instructions to the first switch 124 to terminate the transfer of electric current to the electric motor 146. Once the second lever 138 is at the home position, the processing unit 120 operates the mode selector to operate the operating lever 110 via the actuation lever 128 to put the transmission component 102 in either the driving mode, the neutral mode, or the reverse mode. Moreover, the second switch 126 keeps on powering the solenoid 148 to engage the pawl 142 with the first lever 136 as shown in FIG. 5.

Now, there may be a case, where the driver would want to engage the park mode. Accordingly, the driver operates the gear selector 118 and sends the command to terminate the power to the solenoid 148. In addition, the command may include the instruction to terminate the power to the electric motor 146. Upon receipt of the command, the processing unit 120 compares the command with the repository 122 to determine the set of the instructions for the first switch 124 and the second switch 126. Accordingly, the processing unit 120 sends an instruction to the second switch 126 to terminate the power to the solenoid 148. As the electric current stops flowing into the solenoid 148, the return mechanism pulls the plunger 178 into the solenoid 148 causing the locking projection 176 to disengage from the third side surface 136c. As the locking projection 176 disengages, the biasing element 150 pushes the first lever 136 to move along the second direction D2 towards the home position. The first lever 136 rotates along the second direction D2 until the third side surface 136c abuts the protrusion 170. Further, the energized biasing element 150 keeps the first lever 136 pushed against the second lever 138 to lock the second lever 138 in the home position. Moreover, the first lever 136 pushed by the biasing element 150 also prevents the rotation of the second lever 138 due to vibrations that the electro-mechanical actuator 112 receives from the transmission component 102 during its operation.

According to the present disclosure, there may be a scenario where the driver would want to manually put the vehicle in the non-park position as shown in FIG. 6, for instance, in order to tow the vehicle. The scenario can occur in both cases where the vehicle is in the park position or the non-park position. In such a scenario, the driver sends a manual override command to the processing unit 120. Upon the receipt of the command, the processing unit 120 determines whether the transmission component 102 is in the park position or the non-park position. The processing unit 120 determines the position using the first position sensor 152.

If the processing unit 120 does not receive the signal from the first position sensor 152, the processing unit 120 determines that the transmission component 102 is in the non-park position. Accordingly, the processing unit 120 determines the instructions for the first switch 124 and the second switch 126. Further, the processing unit 120 sends an instruction to the first switch 124 to power the electric motor 146 and to rotate the shaft 192 and worm gear 186 clockwise. The clockwise rotation of the worm gear 186 causes the second lever 138 and the first lever 136 to move counterclockwise in the first direction D1 in a manner explained above. Once the first lever 136 and the second lever 138 move to the locked position, the first position sensor 152 sends the signal to the processing unit 120 indicating that the first lever 136 is at the locked position. Accordingly, the processing unit 120 instructs the first switch 124 to terminate power to the electric motor 146. Further, the second lever 138 and the first lever 136 are maintained in the locked position by the worm gear meshing of the worm gear 186 and the first gear 180. The locked position alleviates a need for constant power supply that otherwise would be required for the solenoid 148 to maintain the transmission component 102 in the non-park position. Thus, this prevents the corresponding vehicle from returning to the park position.

On the other hand, in case the processing unit 120 receives the signal from the first position sensor 152, the processing unit 120 determines that the transmission component 102 is in the park position. Accordingly, the processing unit 120 determines the set of instructions from the library in the repository 122 for the first switch 124 and the second switch 126. For instance, the processing unit 120 sends instructions to the second switch 126 to terminate the electric current to the solenoid 148 thereby retreating the pawl 142. Simultaneously, the processing unit 120 instructs the first switch 124 to facilitate the flow of the electric current to the electric motor 146 from the electrical source to move the second lever 138 in a manner explained in the preceding paragraph. Therefore, the processing unit 120 operates the electro-mechanical actuator 112 to prevent the transmission component 102 to assume the park position.

In one embodiment, there may be a scenario, where the electric power is not available to power the electro-mechanical actuator 112 to prevent the vehicle from returning to the park position. Such a scenario can occur in case the electrical source onboard the vehicle has discharged. Further, for preventing the vehicle from entering the park position in such a scenario, the vehicle may include an external mechanism coupled to the worm gear 186 (shown in FIG. 3) to allow the driver of the vehicle to manually put the vehicle in the non-park position (the manual override condition). The external mechanism can include a rod (not shown in the Figure) rotatably coupled to the worm gear 186 and a crank handle (not shown in Figure) that can attach to the rod to rotate the worm gear 186. In one example, the external mechanism may facilitate counterclockwise rotation of the second lever 138 and the first lever 136 in the first direction D1. Thus, the transmission component 102 and thereby the vehicle transmission system 100 may be manually put in the non-park position (the manual override condition). In one embodiment, the external mechanism may be an external lever, which is positioned such that the driver may conveniently access the external lever.

In case, the driver wishes the put the transmission component 102 back to either of the aforementioned modes, the driver may provide respective commands and the processing unit 120 will operate in a manner explained above.

Although the present disclosure has been described with reference to specific embodiments, this description is not meant to be construed in a limiting sense. Various modifications of the disclosed embodiments, as well as alternate embodiments of the present disclosure, will become apparent to persons skilled in the art upon reference to the description of the present disclosure. It is therefore contemplated that such modifications can be made without departing from the spirit or scope of the present disclosure as defined.

What is claimed is:
1. A vehicle transmission system comprising:
   a transmission component movable between a park position and at least one non-park position; and
   an electro-mechanical actuator coupled to the transmission component, the electro-mechanical actuator including:
      a first lever coupled to the transmission component and movable between a first home position and a first lock position, wherein, when in the first home position, the first lever positions the transmission component in the park position, wherein, when in the first lock position, the first lever positions the transmission component in the at least one non-park position;
      a second lever movable between a second home position and a second lock position, wherein when in the second home position, the second lever does not inhibit the first lever from moving between the first home position and the first lock position, wherein, when the second lever is in the second lock position, the second lever engages the first lever to inhibit the first lever from moving from the first lock position to the first home position;
      a pawl movable between an engaged position and a disengaged position, wherein, when in the engaged position, the pawl inhibits the first lever from moving from the first lock position to the first home position, wherein, when in the disengaged position, the pawl does not inhibit the first lever from moving from the first lock position to the first home position;

an electric motor drivingly coupled to the second lever to move the second lever between the second home position and the second lock position; and a solenoid drivingly coupled to the pawl to move the pawl between the engaged position and disengaged position.

2. The vehicle transmission system of claim 1 further comprising a vehicle control system in electrical communication with the solenoid and the electric motor, wherein the vehicle control system comprises:

a processing unit; and an interface configured to receive a command from a driver of a vehicle in which the vehicle transmission system is installed.

3. The vehicle transmission system of claim 2, wherein the processing unit is configured to operate the solenoid to move the pawl to the engaged position in response to the command being a request for putting the transmission component in the non-park position.

4. The vehicle transmission system of claim 2, wherein the processing unit is configured to operate the electric motor to move the second lever to the second lock position in response to the command being a manual override command.

5. The vehicle transmission system of claim 1, wherein the vehicle transmission system does not comprise a mechanical shifter that is coupled to the transmission component by a cable for mechanically controlling the operation of the transmission component.

6. The vehicle transmission system of claim 1, wherein the solenoid is configured to move the pawl to the engaged position in response to the solenoid receiving power and to move the pawl to the disengaged position upon loss of power to the solenoid.

7. The vehicle transmission system of claim 1, wherein the at least one non-park position is at least one of a drive position, a reverse position and a neutral position of the transmission component.

8. A vehicle comprising:
the vehicle transmission system of claim 1.

9. An autonomous vehicle comprising:
the vehicle transmission system of claim 1.

10. An electro-mechanical actuator comprising:

a first lever configured to be coupled to a transmission component that is movable between a park position and at least one non-park position, the first lever being movable between a first home position and a first lock position, wherein, when in the first home position, the first lever is configured to position the transmission component in the park position, wherein, when in the first lock position, the first lever is configured to position the transmission component in the at least one non-park position;

a second lever movable between a second home position and a second lock position, wherein when in the second home position, the second lever does not inhibit the first lever from moving between the first home position and the first lock position, wherein, when the second lever is in the second lock position, the second lever engages the first lever to inhibit the first lever from moving from the first lock position to the first home position;

a transfer gear drivingly coupled to the second lever such that rotation of the transfer gear moves the second lever between the second home position and the second lock position;

a pawl movable between an engaged position and a disengaged position, wherein, when in the engaged position, the pawl inhibits the first lever from moving from the first lock position to the first home position, wherein, when in the disengaged position, the pawl does not inhibit the first lever from moving from the first lock position to the first home position;

an electric motor drivingly coupled to the transfer gear; and a solenoid drivingly coupled to the pawl to move the pawl between the engaged position and the disengaged position.

11. The electro-mechanical actuator of claim 10 further comprising:

a worm gear driven by the electric motor and configured to drive the second lever.

12. The electro-mechanical actuator of claim 10, wherein the solenoid is configured to move the pawl to the engaged position in response to the solenoid receiving power and to move the pawl to the disengaged position upon loss of power to the solenoid.

13. The electro-mechanical actuator of claim 10, wherein the first lever is biased toward the first home position.

14. The electro-mechanical actuator of claim 10, wherein the second lever and the first lever are rotatable about a common axis.

15. The electro-mechanical actuator of claim 14, wherein the second lever includes a protrusion that extends axially relative to the common axis and is configured to engage the first lever such that rotation of the second lever from the second home position to the second lock position rotates the first lever from the first home position to the first lock position.

16. The electro-mechanical actuator of claim 10, further including a first sensor configured to detect a rotational position of one of the first lever and the second lever.

17. The electro-mechanical actuator of claim 16, further including a second sensor configured to detect a rotational position of the other one of the first lever and the second lever.

18. A vehicle transmission system comprising:

a transmission component movable between a park position and at least one non-park position; and an electro-mechanical actuator coupled to the transmission component, the electro-mechanical actuator including:

a first lever coupled to the transmission component and movable between a first home position and a first lock position, wherein, when in the first home position, the first lever positions the transmission component in the park position, wherein, when in the first lock position, the first lever positions the transmission component in the at least one non-park position, wherein the first lever is biased toward the first home position;

a second lever movable between a second home position and a second lock position, wherein when in the second home position, the second lever does not inhibit the first lever from moving between the first home position and the first lock position, wherein, when the second lever is in the second lock position, the second lever engages the first lever to inhibit the first lever from moving from the first lock position to the first home position;

a pawl movable between an engaged position and a disengaged position, wherein, when in the engaged position, the pawl inhibits the first lever from moving from the first lock position to the first home position, wherein, when in the disengaged position, the pawl does not inhibit the first lever from moving from the first lock position to the first home position, wherein the pawl is biased toward the disengaged position; and an electric motor drivingly coupled to the second lever to move the second lever between the second home position and the second lock position.

19. The vehicle transmission system of claim 18, wherein the electro-mechanical actuator further includes a solenoid configured to move the pawl to the engaged position in response to the solenoid receiving power and to permit the pawl to move to the disengaged position upon loss of power to the solenoid.

20. The vehicle transmission system of claim 18, wherein the second lever and the first lever are rotatable about a common axis.

* * * * *